US010781864B2

(12) United States Patent
Grengs (10) Patent No.: US 10,781,864 B2
(45) Date of Patent: Sep. 22, 2020

(54) DRIVE WHEEL CLUTCH SYSTEM (71) Applicant: GLG Farms LLC, Sherwood, ND (US)

(72) Inventor: Greg L. Grengs, Sherwood, ND (US)

(73) Assignee: GLG Farms LLC, Sherwood, ND (US)

(*) Notice: Subject to any disclaimer, the term of this patent is extended or adjusted under 35 U.S.C. 154(b) by 47 days.

(21) Appl. No.: 16/193,211

(22) Filed: Nov. 16, 2018

(65) Prior Publication Data

US 2020/0158184 A1 May 21, 2020

(51) Int. Cl.
F16D 11/14 (2006.01)
B60B 27/02 (2006.01)
B60B 27/06 (2006.01)
F16D 23/12 (2006.01)
F16D 11/00 (2006.01)

(52) U.S. Cl.
CPC ............ F16D 11/14 (2013.01); B60B 27/02 (2013.01); B60B 27/065 (2013.01); F16D 23/12 (2013.01); F16D 2011/006 (2013.01)

(58) Field of Classification Search
CPC ............ F16D 23/00; F16D 2011/006; F16D 2011/004
USPC ....................................... 192/69.43
See application file for complete search history.

(56) References Cited

U.S. PATENT DOCUMENTS

| 3,154,189 A | 10/1964 | O'Hanion |
| 3,338,636 A | 8/1967 | Chapman |
| 3,351,364 A * | 11/1967 | Warn ............... F16D 11/14 403/1 |
| 3,462,199 A | 8/1969 | Harris |
| 3,842,714 A | 10/1974 | Coleman |
| 3,897,691 A * | 8/1975 | Robinson ............... F16D 1/112 74/405 |
| 4,332,261 A | 6/1982 | Webster |
| 4,365,696 A * | 12/1982 | Telford ............... B60B 27/0026 192/112 |
| 4,455,922 A | 6/1984 | Brelsford |
| 4,459,079 A | 7/1984 | Brelsford |
| 4,596,424 A | 6/1986 | Wilcox, Jr. |
| 4,603,775 A | 8/1986 | Plett |
| 4,742,938 A | 5/1988 | Niewold |
| 4,963,066 A | 10/1990 | Boppart |
| 4,989,716 A | 2/1991 | Stuckey |
| 5,099,986 A | 3/1992 | Kuzub |

(Continued)

OTHER PUBLICATIONS

Hutchinson Swing-Away Portable Augers Brochure; 2004.
Hopper Walker; http://hopperwalker.com; Rust Sales, Harwood, ND; Rcvd. May 25, 2010.

Primary Examiner — Timothy Hannon
(74) Attorney, Agent, or Firm — Neustel Law Offices (57) ABSTRACT A drive wheel clutch system for manually disengaging one or more drive wheels from their driveshafts. The drive wheel clutch system generally includes a driveshaft, a flange at one end of the driveshaft, and a flange-engaging member. The flange-engaging member and the flange may be generally disc shaped. The flange-engaging member is spring loaded and includes locking members that can extend through apertures in the flange to engage with locking apertures in the hub of a drive wheel. An operator can pull against spring bias and rotate a handle connected to the flange-engaging member to disengage the locking members from the flange and the hub, allowing the wheel to turn freely while the driveshaft remains stationary.

20 Claims, 8 Drawing Sheets (56) References Cited

U.S. PATENT DOCUMENTS

| | | | |
|---|---|---|---|
| 5,129,502 | A | 7/1992 | Justice |
| 5,184,715 | A | 2/1993 | Feterl |
| 5,230,419 | A | 7/1993 | Millard |
| 5,305,866 | A | 4/1994 | Stewart |
| 5,343,995 | A | 9/1994 | Scarrow |
| 5,351,805 | A | 10/1994 | Miller |
| 5,431,523 | A | 7/1995 | Ferguson |
| 5,492,217 | A | 2/1996 | Stewart |
| 5,515,961 | A | 5/1996 | Murphy |
| 5,718,556 | A | 2/1998 | Forsyth |
| 5,746,303 | A | 5/1998 | Niewold |
| 5,785,481 | A | 7/1998 | Ockels |
| 5,888,044 | A | 3/1999 | Baskerville |
| 5,964,566 | A | 10/1999 | Stewart |
| 6,068,103 | A | 5/2000 | Werner |
| 6,120,233 | A | 9/2000 | Adam |
| 6,296,435 | B1 | 10/2001 | Wood |
| 6,325,588 | B1 | 12/2001 | Nolin |
| 6,497,546 | B2 | 12/2002 | Wood |
| 6,722,489 | B1 | 4/2004 | Cook |
| 7,063,497 | B2 | 6/2006 | Mast |
| 7,090,066 | B2 | 8/2006 | Kirsch |
| 7,191,889 | B1 | 3/2007 | Heley |
| 7,428,956 | B2 | 9/2008 | Scherman |
| 7,438,009 | B2 | 10/2008 | Grant |
| 7,488,149 | B2 | 2/2009 | Waldner |
| 7,552,818 | B2 | 6/2009 | Makinen |
| 7,708,131 | B2 | 5/2010 | Muth |
| 7,891,641 | B1 | 2/2011 | Miller |
| 7,946,416 | B2 | 5/2011 | Grose |
| 8,118,151 | B1 | 2/2012 | Jesse |
| 8,272,493 | B1 | 9/2012 | Grengs |
| 2016/0238081 | A1* | 8/2016 | Knuth ................... B60K 17/28 |
| 2018/0355919 | A1* | 12/2018 | Livengood ................ F16D 1/10 |

\* cited by examiner

DRIVE WHEEL CLUTCH SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND

Field

Example embodiments in general relate to a drive wheel clutch system for allowing the drive wheels of a swing auger to be coupled to motors or to be uncoupled so that the swing auger can be moved manually.

Related Art

Any discussion of the related art throughout the specification should in no way be considered as an admission that such related art is widely known or forms part of common general knowledge in the field.

Swing augers have been in use in agricultural applications for some time. In the past, swing augers and hoppers had to be manually pushed or pulled to a desired location, which required operators to dismount from the tractor and physically move the hopper. Swing augers and hoppers may be quite heavy and difficult to move. This, coupled with the need for operators to dismount in order to manually move the hopper into position beneath a truck (for example), has made powered, remotely-controlled swing augers more popular. Such swing augers can use electrical or hydraulic power from the tractor or other sources to drive the wheels and position the hopper as desired. However, the drive wheels of powered swing augers typically will not rotate freely when they are not being driven, and so may only move when powered. This can prevent manually positioning the swing hopper even a short distance, which is often desirable.

SUMMARY

An example embodiment is directed to a drive wheel clutch system. The drive wheel clutch system includes a driveshaft having a flange, and a flange-engaging member. The example embodiment also includes a wheel and a wheel hub. The flange-engaging member may include one or more locking members that engage with apertures in the flange and with locking apertures in the wheel hub when the clutch is engaged. The flange-engaging member may be spring biased so that the flange and the flange-engaging member are biased toward each other. When the clutch is engaged, the locking members enter the apertures and the locking apertures, so that the wheel is coupled to the driveshaft. The flange-engaging member may also include a handle so that an operator may disengage the clutch by using the handle to pull the flange-engaging member away from the flange and the wheel hub and rotate it so that the locking members are disengaged from the apertures of the flange-engaging member and the locking apertures of the wheel hub.

There has thus been outlined, rather broadly, some of the embodiments of the drive wheel clutch system in order that the detailed description thereof may be better understood, and in order that the present contribution to the art may be better appreciated. There are additional embodiments of the drive wheel clutch system that will be described hereinafter and that will form the subject matter of the claims appended hereto. In this respect, before explaining at least one embodiment of the drive wheel clutch system in detail, it is to be understood that the drive wheel clutch system is not limited in its application to the details of construction or to the arrangements of the components set forth in the following description or illustrated in the drawings. The drive wheel clutch system is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein.

DETAILED DESCRIPTION

A. Overview.

Figure 1:
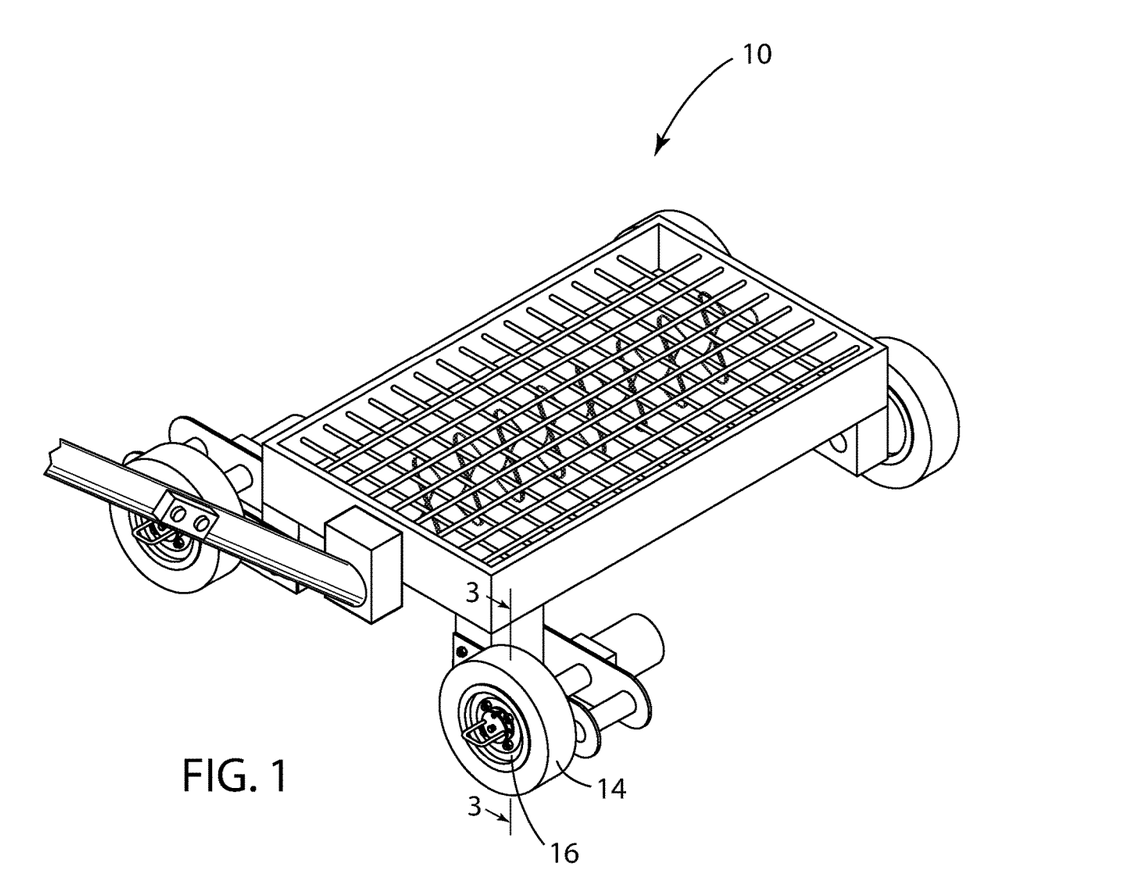
FIG. 1 is a perspective view of a drive wheel clutch system in accordance with an example embodiment.
Figure 2:
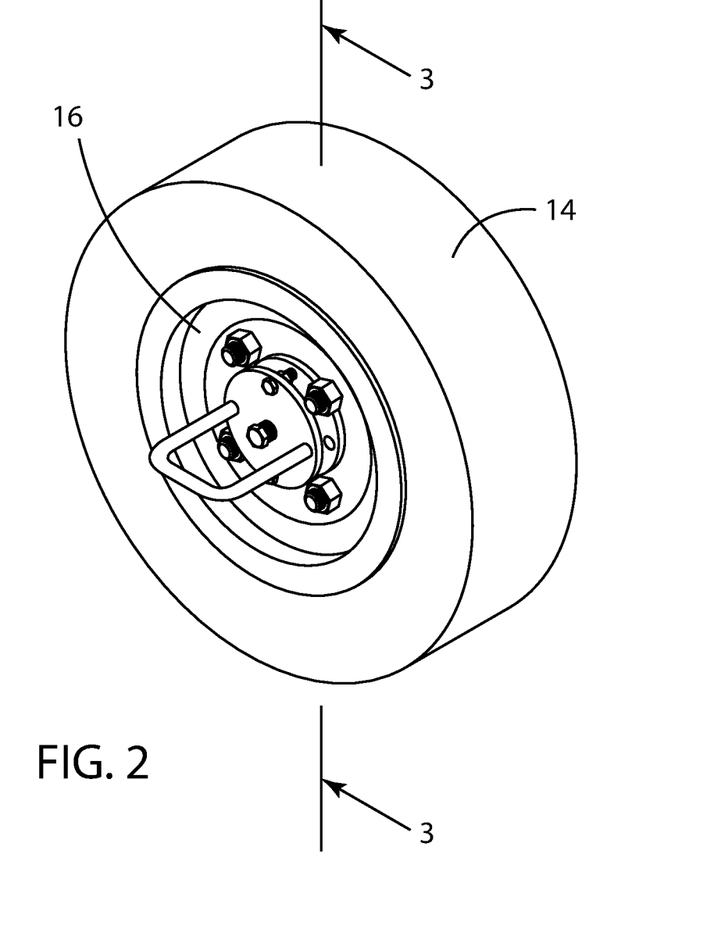
FIG. 2 is a perspective view of a single wheel of the system in accordance with an example embodiment, shown with the clutch disengaged.

An example swing auger 10 is shown in FIG. 1, which illustrates in general the swing auger and also the swing hopper with drive wheels. FIG. 1 indicates the rim 16 and tire 14 of a driven wheel and also shows a section line for FIG. 3. As can be seen, by having powered wheels (such as the two drive wheels closest to the auger in FIG. 1), the swing hopper (which receives grain to be lifted by the auger) can be positioned without manually pushing or pulling it into place. Swing augers, such as swing auger 10, typically need to be moved into position underneath grain-carrying trucks, and powered swing augers allow for easier positioning of swing hoppers without requiring as much moving of trucks, and without the need for an operator to manually move the hopper.

While powered, remote-control swing augers are useful, there are times when an operator may want to position the swing hopper manually. Doing so may be difficult or impossible while the drive wheels are engaged with drive motors, since the drive wheels won't turn freely, so a drive wheel clutch system that allows for disengagement can be used to allow for manual positioning.

An example drive wheel clutch system generally comprises a driveshaft 22 having a flange 30, a flange-engaging member 41, and a wheel hub 50. The example drive wheel clutch system can be used, for example, to disengage the driven wheels of the hopper of a swing auger, so that in addition to being movable under power, the swing hopper can be moved manually.

The driveshaft 20 rotates within collar 54 of the wheel hub 50, and may be driven by a hydraulic or electric motor at one end, and may be connected to the driven tire 14 at the other end.

The flange-engaging member 41 may include one or more locking members 42 that pass through apertures 32 in the flange 30 and engage with locking apertures 58 in wheel hub 50 when the clutch is engaged. The locking members 42 may be bolts, held in place on the flange-engaging member 41 by nuts 43. The flange-engaging member 41 may be biased with a spring 47 so that the flange 30 and the flange-engaging member 41 are forced toward each other, and the locking members 42 pass through the apertures 32 and engage locking apertures 58. The flange-engaging member 41 may also include a handle 40 so that an operator may disengage the clutch by using the handle 40 to pull the flange-engaging member 41 away from the flange 30 and rotate it so that the locking members 42 are disengaged from the locking apertures 58.

Figures 5, 6:
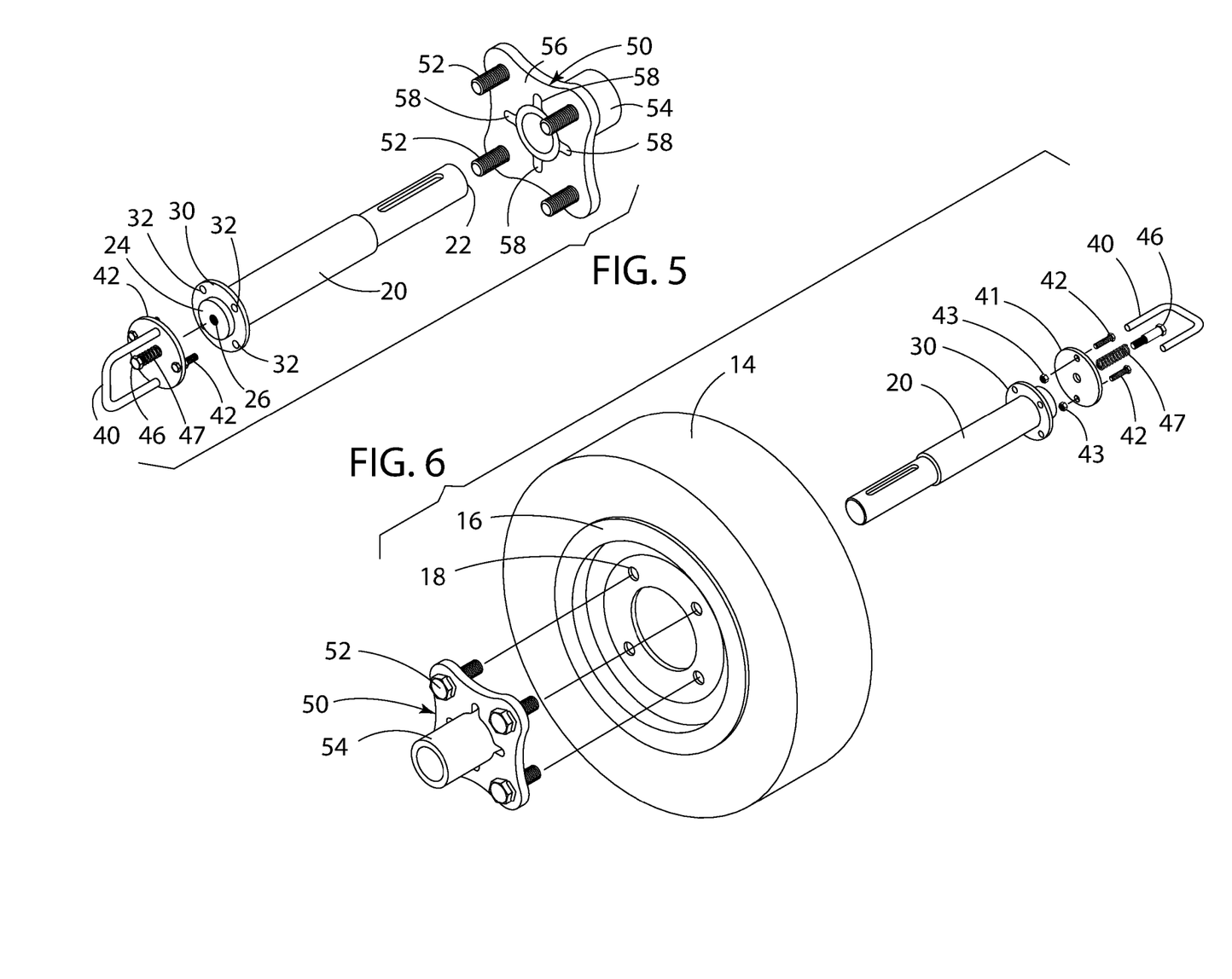
FIG. 5 is a perspective, exploded view of a drive wheel clutch system in accordance with an example embodiment.
FIG. 6 is a perspective view of a drive wheel clutch system and a wheel assembly in accordance with an example embodiment.

Wheel hub 50 is coupled to the drive shaft 20 when the clutch is engaged as discussed above, due to engagement of locking members 42 with locking apertures 58 in hub member 56 (FIG. 5). The wheel hub 50 is connected to rim 16 by threaded members 52 that pass through holes in hub member 56. Tire 14 is mounted on rim 16. Hub member 56 thus rotationally couples the driveshaft 20 to the rim 16 by use of locking members 42 and threaded members 52. A swing hopper may typically have four tires, although a different number is possible. One or more tires of a swing hopper may be motor driven, enabling operation by remote control, or simply to eliminate the need for manually positioning the swing hopper.

B. Driveshaft.

Figure 4:
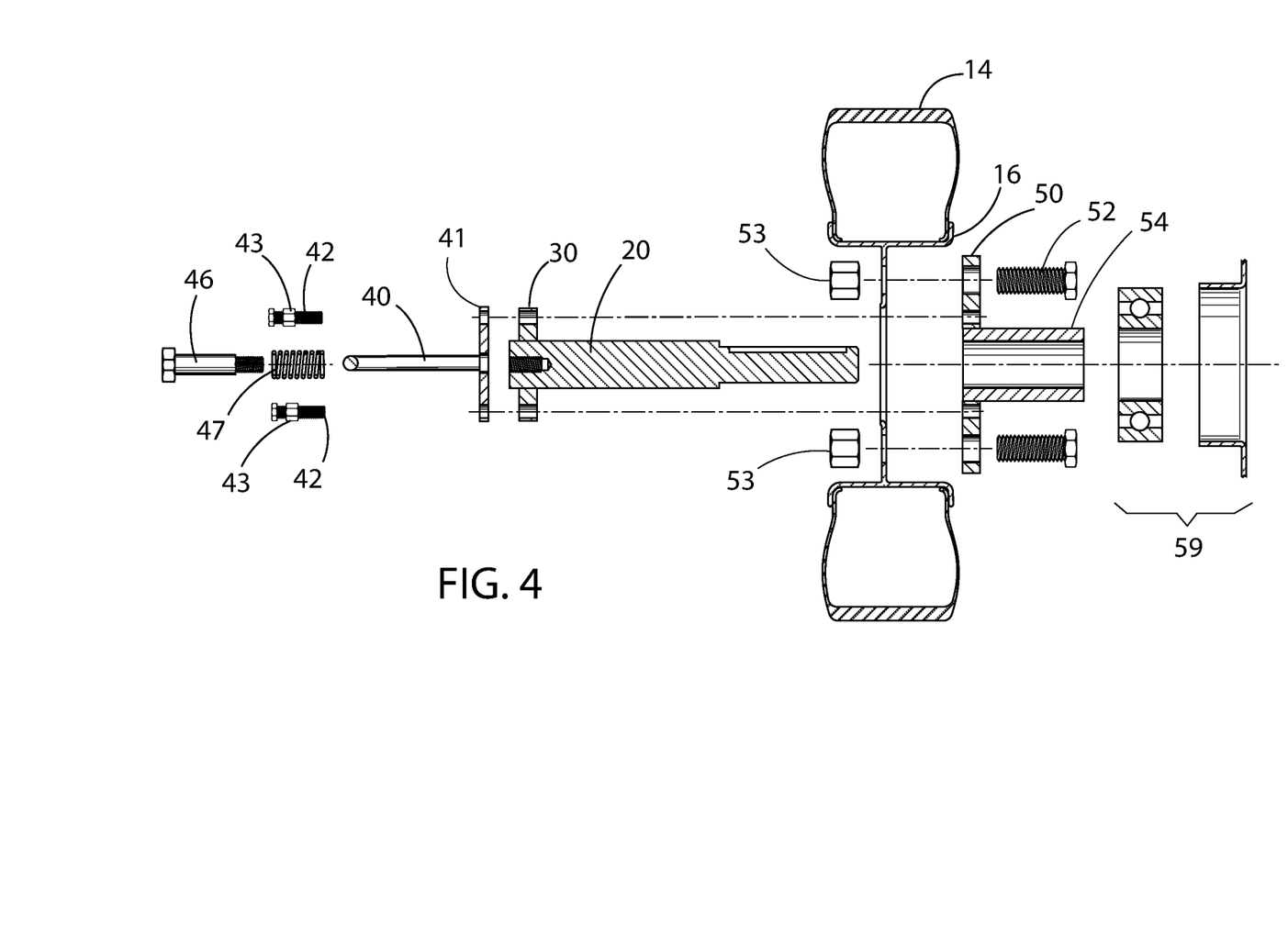
FIG. 4 is a sectional, exploded view of a drive wheel clutch system in accordance with an example embodiment.

As best shown in FIGS. 4, 5, and 6, the system comprises a driveshaft 20. The first end 22 of driveshaft 20 may be coupled to a drive motor (not shown), while the second end 24 is connected to a wheel comprising a rim 16, a tire 14, and a wheel hub 50. The second end 24 of the drive shaft 20 is coupled to the wheel hub 50 via flange 30, flange-engaging member 41, and wheel hub 50 which, generally, comprise the drive wheel clutch system. When the clutch is engaged, the driveshaft 20 is coupled to the wheel hub 50 by locking members 42, which pass through the flange-engaging member 41, the flange 30, and then engage in locking apertures 58 of the wheel hub 50. Thus, the flange is rotationally locked to the wheel hub 50 by locking members 42.

The driveshaft 20 includes a flange 30 at one end, generally opposite the drive motor end of driveshaft 20. The flange 30 may be generally disc shaped, and may also be coupled to flange-engaging member 41, which as shown may also be disc shaped. Flange 30 and flange-engaging member 41 may be coupled together by connecting member 46 and locking members 42. Connecting member 46 may be a shoulder bolt that passes through a hole in the center of flange-engaging member 41 and engages with an end aperture 26 in the center of driveshaft 20. Thus, connecting member 46 keeps the flange 30 and flange-engaging member 41 aligned with and connected to each other. However, connecting member 46 does not prevent the flange 30 and flange-engaging member 41 from rotating relative to each other, because the hole in the center of flange-engaging member 41 is not threaded and is large enough to allow rotation of the flange 30 with respect to the flange-engaging member 41.

C. Flange and Flange-Engaging Member.

In an example embodiment, a compression spring 47 is positioned over connecting member 46, between the head of the connecting member and the surface of the flange-engaging member 41. Spring 47 thus biases the flange-engaging member 41 toward flange 30. Flange 30 is connected to the end of driveshaft 20, so that when driveshaft 20 turns, flange 30 also turns. Flange-engaging member 41 includes two locking members 42. In an example embodiment, the locking members 42 may be bolts that pass through the flange-engaging member 41 and held in place with nuts 43. The flange-engaging member 41 may include a handle 40, which can be used to manually disengage the clutch as will be described in detail below.

Figure 7:
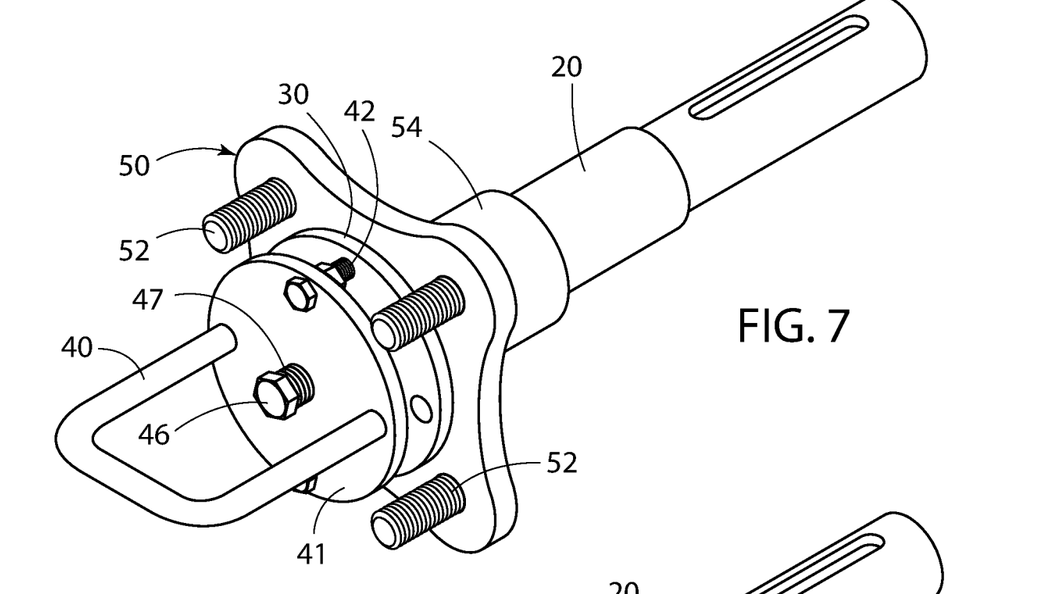
FIG. 7 is a perspective view of a drive wheel clutch system in accordance with an example embodiment, shown with the clutch disengaged.
Figure 8:
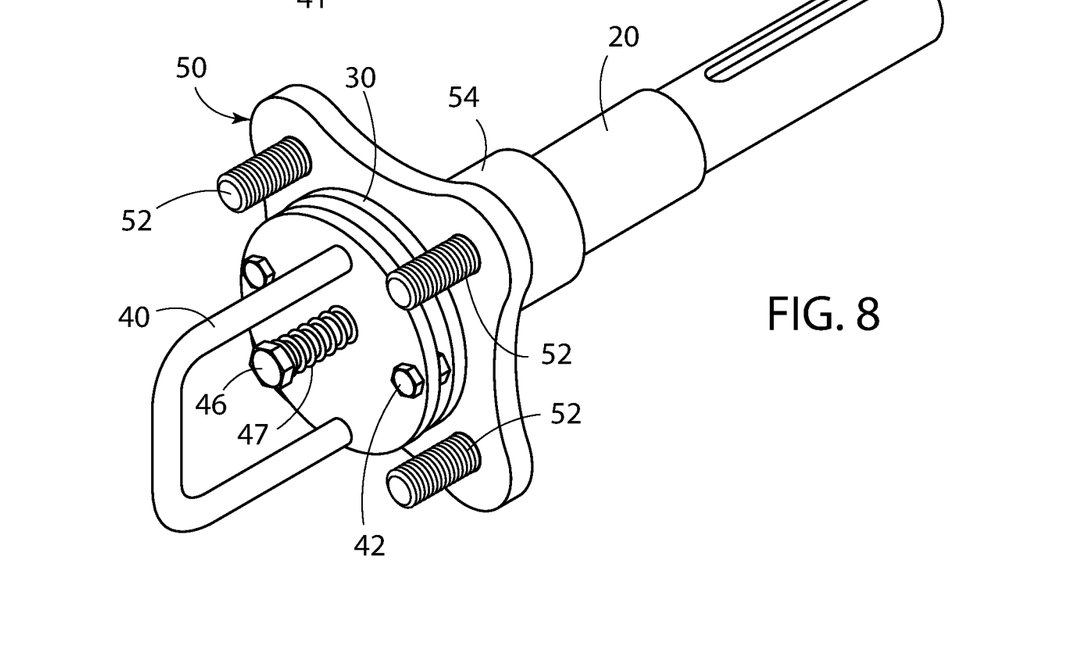
FIG. 8 is a perspective view of a drive wheel clutch system in accordance with an example embodiment, shown with the clutch engaged.
Figure 9A:
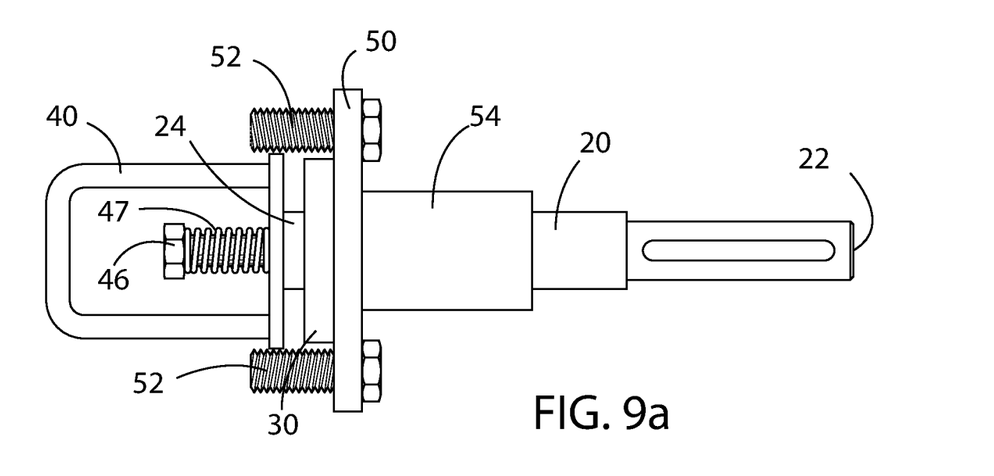
FIG. 9*a* is a side view of a drive wheel clutch system in accordance with an example embodiment, shown with the clutch engaged.
Figure 9B:
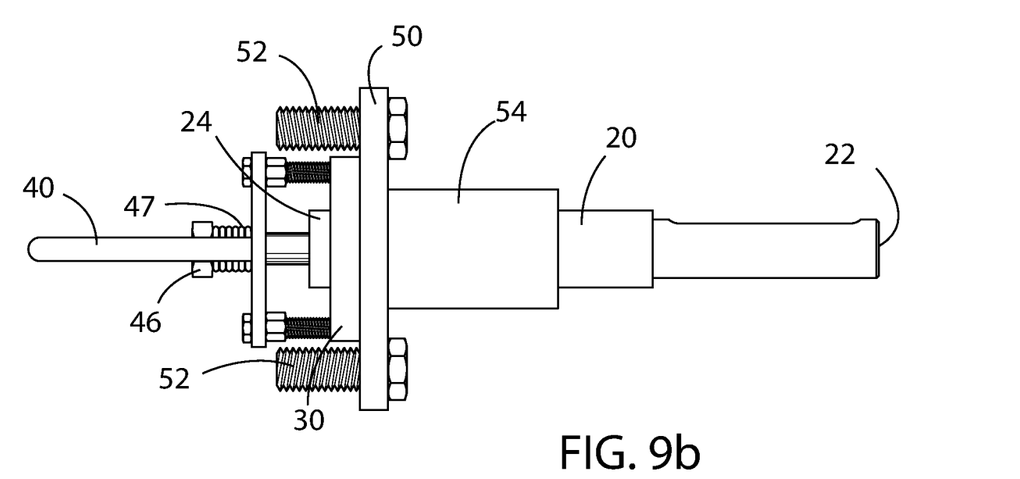
FIG. 9*b* is a side view of a drive wheel clutch system in accordance with an example embodiment, shown with the clutch disengaged.
Figure 9C:
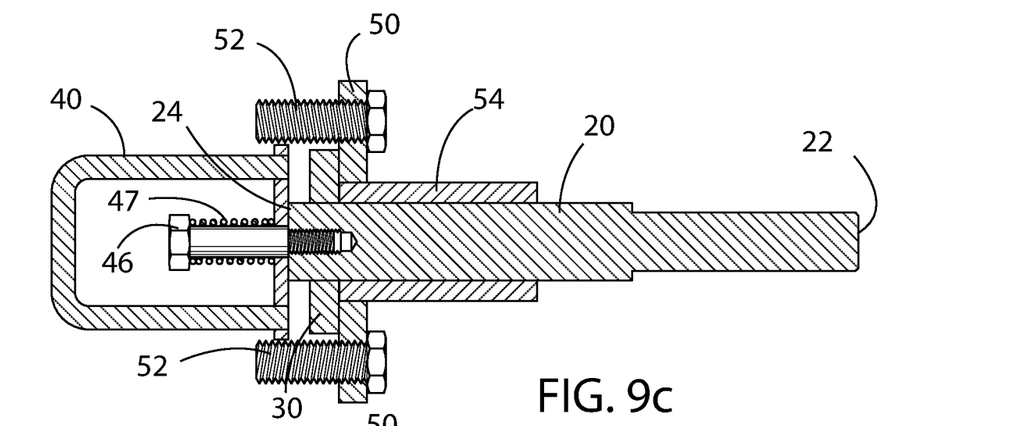
FIG. 9*c* is a sectional view of a drive wheel clutch system in accordance with an example embodiment, shown with the clutch engaged.

In an example embodiment, as shown in FIGS. 7 and 8, there are two locking members 42, which may be either aligned so that they pass into and beyond apertures 32 of flange 30 (FIGS. 8 & 9d), or held out of engagement by the surface of flange 30 when flange-engaging member 41 is rotated (FIGS. 7 & 9b). The locking members 42 are long enough so that they may extend entirely through flange 30 and into engagement with the locking apertures 58 of wheel hub 50 when the clutch is engaged (see FIG. 9d).

Figure 9D:
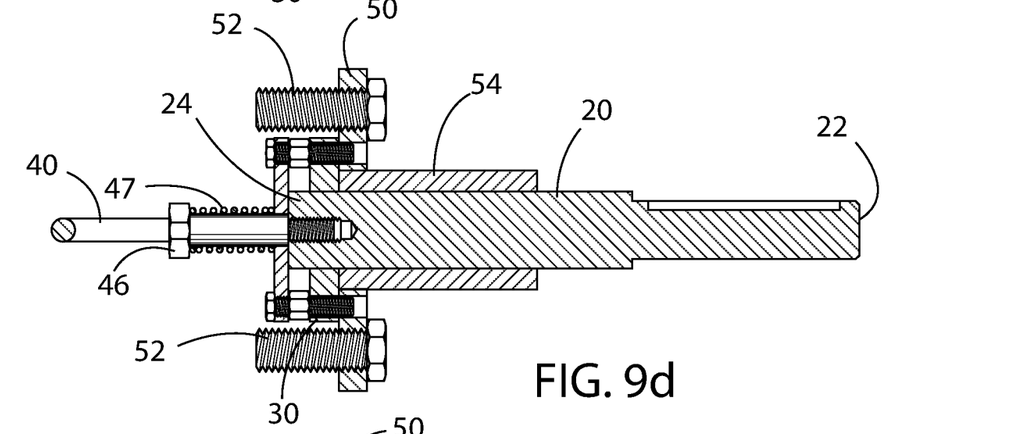
FIG. 9*d* is another sectional view of a drive wheel clutch system in accordance with an example embodiment, shown with the clutch engaged.
Figure 9E:
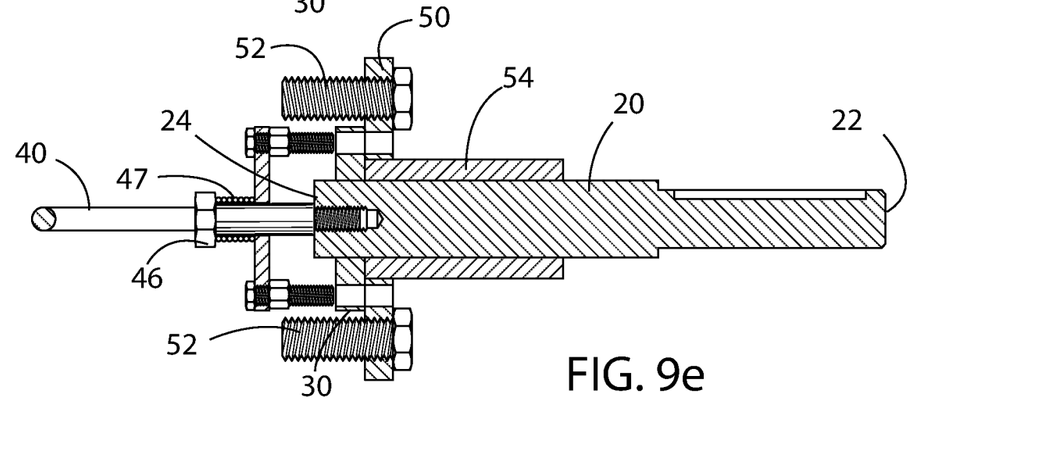
FIG. 9*e* is a sectional view of a drive wheel clutch system in accordance with an example embodiment, shown with the clutch disengaged.

In engaged position, as shown in FIG. 9d, the flange 30 and flange-engaging member 41 are as close to each other as possible, separated by the thickness of the nuts 43 on locking members 42, as shown in FIG. 8. As also shown in FIGS. 8 and 9d, spring 47 is fully extended. In this state, locking members 42 pass through apertures 32 of flange 30 and into engagement with locking apertures 58 of wheel hub 50, as shown in FIG. 9d. This engagement rotationally couples the driveshaft 20, flange 30, flange-engaging member 41, and wheel hub 50 together. The clutch is thus "engaged", and when a motor turns the driveshaft, the wheel will be driven.

In the disengaged position, as shown in FIG. 9b, the flange 30 and flange-engaging member 41 are farther apart, and locking members 42 do not enter apertures 32 or locking apertures 58 of wheel hub 50. Thus, in this position, the driveshaft 20 is not rotationally coupled to the wheel hub 50, which may thus rotate independent of driveshaft 20.

In an example embodiment, as shown in FIGS. 5 and 6, the flange 30 and wheel hub 50 may have four apertures, so that the two locking members can engage the flange and wheel hub 50 in multiple positions, as will be explained in more detail below.

D. Wheel Hub.

Figure 3:
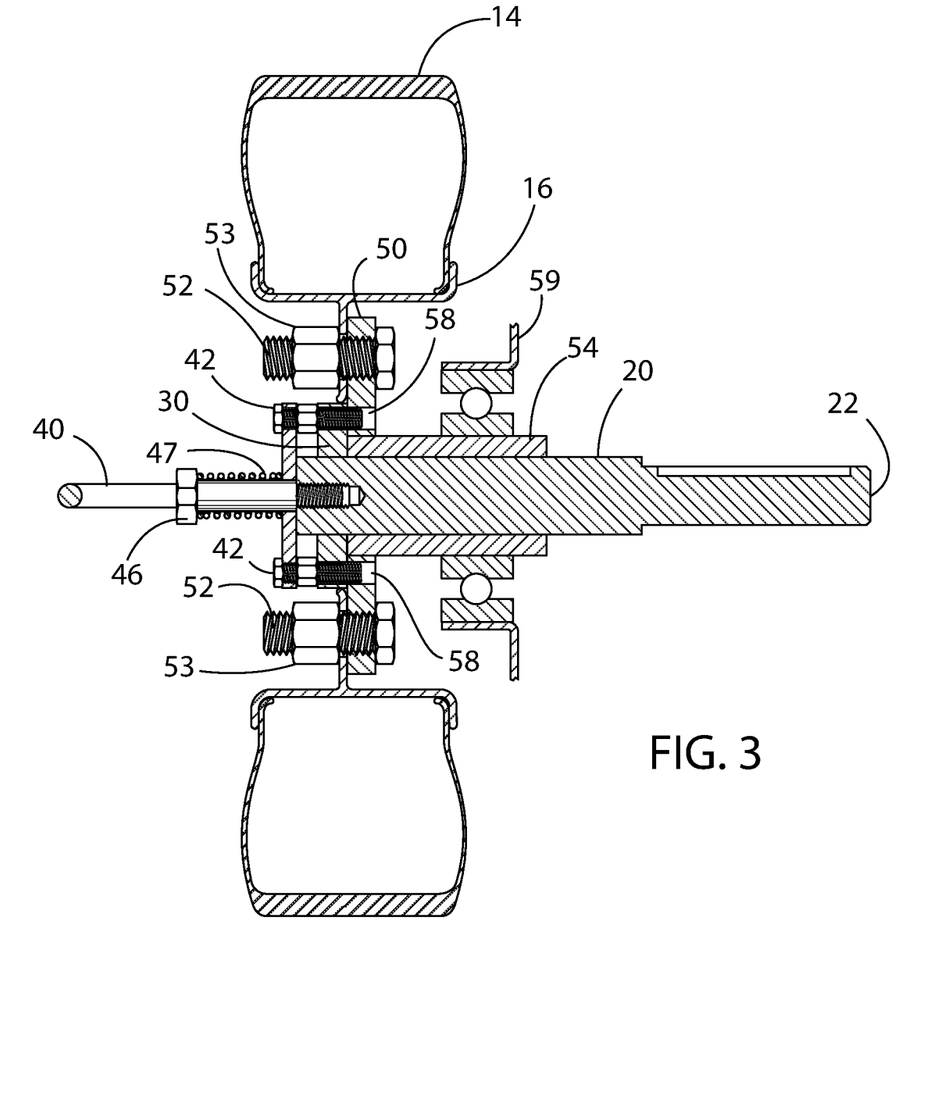
FIG. 3 is a sectional view of a drive wheel clutch system in accordance with an example embodiment, shown with the clutch engaged.

As shown in FIG. 6, an example embodiment includes a wheel hub 50, which can be attached to a rim 16, which in turn has a mounted tire 14. As best shown in FIGS. 4 and 6, the hub member 56 of wheel hub 50 is attached to rim 16 by threaded members 52 that extend through rim apertures 18 in rim 16, and held in place with nuts 53 (see FIG. 4). The wheel hub 50 may also include a collar 54 that holds the wheel and allows it to rotate around driveshaft 20 when the clutch is disengaged. The collar 54 and hub member 56 will both rotate with the driveshaft when the clutch is engaged. The wheel hub 50 may be held in place on the swing hopper frame by bearing 59 which engages collar 54, as best shown in FIGS. 3 & 4.

As shown in FIG. 5, the hub member 56 may have multiple locking apertures 58, which are engaged by locking members 42. In an example embodiment, there may be four locking apertures 58, located 90° apart around the hub member 56. By having four locking apertures, the clutch may be engaged with only 90° or less of driveshaft rotation.

E. Operation of Preferred Embodiment.

In use, the clutch may be in the engaged or disengaged position. As described above, when the clutch is engaged, the locking members 42 extend through apertures 32 in the flange 30, and into engagement with the locking apertures 58 of wheel hub 50 (see FIGS. 8 & 9d). In this engaged condition, the driveshaft 20, flange 30, flange-engaging member 41, and wheel hub 50 are all rotationally engaged, and thus turn together when the motor (not shown) turns the driveshaft 20. In this condition, the swing hopper may be positioned under power from one or more motors, but may not typically be positioned manually, due to the motors holding the driveshaft 20 in place.

To disengage the clutch, an operator pulls the handle 40, which in turn pulls the flange-engaging member 41, against the force of spring 47, away from and out of engagement with the flange 30. This also disengages locking members 42 from the locking apertures 58 of the hub member 56. The operator then turns handle 40 and releases it so that locking members 42 are now held out of engagement with locking apertures 58, and rest against the outer surface of flange 30, as best shown in FIG. 9b. In this position, the locking members 42 are held against flange 30 by the force of spring 47, which prevents the locking members 42 from reengaging accidentally.

In the disengaged state, the wheel hub 50, and thus tire 14, can freely rotate even though the driveshaft 20 is not moving. The collar 54 of wheel hub 50 rotates about driveshaft 20 when the clutch is disengaged. Collar 54 also rotates within bearing 59 when the wheel is turning. The driveshaft 20 passes through collar 54, while the wheel hub 50 is still held in place by the driveshaft 20. The wheel hub 50 is also held in place axially by flange 30, although while disengaged, the hub member 56 and collar 54 rotate with respect to the driveshaft 20 and the flange 30.

To reengage the clutch, an operator can turn the handle 40 until the locking members 42 enter apertures 32 on flange 30. As shown in FIG. 5, for example, the flange 30 may have four apertures 32, spaced 90° apart. In an example embodiment as shown in FIG. 9b, there may be two locking members 42, located 180° apart on flange-engaging member 41. Because of this, the operator will only need to turn the handle 90° or less to reengage the clutch. At this point, since the drive wheel may have been rotated with respect to the driveshaft, the locking members 42 may not engage with locking apertures 58 on hub member 56.

If there is no engagement immediately, when the drive wheel motors are next used to move the swing hopper, the locking members 42 will engage the locking apertures 58 as soon as the locking members are properly aligned with the locking apertures 58 due to rotation of flange 30 and flange-engaging member 41, since spring 47 will be forcing the locking members 42 into engagement position toward the first end 22 of driveshaft 20. Again, due to the four locking apertures 58 on hub member 56, the driveshaft will only need to rotate 90° or less in order for the clutch to engage. Thus engaged, the swing hopper can be operated by remote control until an operator desires to manually position it again.

Unless otherwise defined, all technical and scientific terms used herein have the same meaning as commonly understood by one of ordinary skill in the art to which this invention belongs. Although methods and materials similar to or equivalent to those described herein can be used in the practice or testing of the drive wheel clutch system, suitable methods and materials are described above. All publications, patent applications, patents, and other references mentioned herein are incorporated by reference in their entirety to the extent allowed by applicable law and regulations. The drive wheel clutch system may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

What is claimed is:

1. A clutch, comprising:
   a driveshaft having a rotational axis;
   a flange rotationally coupled to a first end of the driveshaft, the flange comprising at least one aperture;
   a flange-engaging member adapted to releasably engage the flange;
   a hub comprising at least one locking aperture;
   a connecting member adapted to hold the flange and the flange-engaging member substantially in axial alignment while allowing the flange-engaging member to move toward or away from the flange along the axis;
   at least one locking member disposed on the flange-engaging member, the locking member adapted for releasably engaging the at least one aperture and the at least one locking aperture;
   wherein the at least one locking member rotationally locks the flange, the flange-engaging member, and the hub together when engaged, and wherein the hub can rotate with respect to the flange and the driveshaft when the at least one locking member is disengaged.

2. The clutch of claim 1, further comprising a biasing member adapted to bias the flange and the flange-engaging member toward each other.

3. The clutch of claim 2, wherein the flange-engaging member comprises a first surface adjacent to the flange and a second surface opposite the first surface, and wherein the biasing member is a spring positioned along the axis of the driveshaft and further positioned to engage the second surface of the flange-engaging member.

4. The clutch of claim 3, wherein the connecting member is a bolt, and wherein the spring is positioned between a head of the bolt and the second surface of the flange-engaging member.

5. The clutch of claim 1, wherein the flange-engaging member is movable away from and rotatable with respect to the flange and the hub, and wherein the driveshaft and the hub are thus rotationally disengagable.

6. The clutch of claim 5, further comprising a handle on the flange-engaging member.

7. The clutch of claim 1, wherein the at least one locking member comprises two locking members circumferentially spaced apart on the flange-engaging member.

8. The clutch of claim 7, wherein the at least one aperture comprises two apertures and the at least one locking aperture comprises two locking apertures, wherein the apertures and the locking apertures are positioned to be simultaneously engageable by the at least two locking members.

9. The clutch of claim 7, wherein the at least one aperture comprises four apertures and the at least one locking aperture comprises four locking apertures, wherein at least two of the apertures and at least two of the locking apertures are positioned to be simultaneously engageable by the at least two locking members.

10. The clutch of claim 1, wherein the hub further comprises a generally cylindrical collar adapted for mounting the hub on the driveshaft.

11. A clutch, comprising:
a driveshaft having a rotational axis;
a flange rotationally coupled to a first end of the driveshaft, the flange comprising at least two apertures;
a flange-engaging member adapted to releasably engage the flange;
a biasing member adapted to bias the flange and the flange-engaging member toward each other;
a hub comprising at least two locking apertures;
a connecting member adapted to hold the flange and the flange-engaging member substantially in axial alignment while allowing the flange-engaging member to move toward or away from the flange along the axis;
at least two locking members disposed on the flange-engaging member, the at least two locking members adapted for releasably engaging the at least two apertures and the at least two locking apertures;
wherein the at least one locking member rotationally locks the flange, the flange-engaging member, and the hub together when engaged, and wherein the hub can rotate with respect to the flange and the driveshaft when the at least one locking member is disengaged.

12. The clutch of claim 11, wherein the flange-engaging member is movable away from and rotatable with respect to the flange and the hub, wherein the driveshaft and the hub are thus rotationally disengagable.

13. The clutch of claim 12, further comprising a handle on the flange-engaging member.

14. The clutch of claim 13, wherein the at least two locking members are circumferentially spaced apart on the flange-engaging member.

15. The clutch of claim 14, wherein the flange-engaging member is movable away from and rotatable with respect to the flange and the hub, and wherein the driveshaft and the hub are thus rotationally disengagable.

16. The clutch of claim 15, wherein the at least two apertures comprise four apertures and the at least two locking apertures comprise four locking apertures, wherein at least two of the apertures and at least two of the locking apertures are positioned to be simultaneously engageable by the at least two locking members.

17. The clutch of claim 11, wherein the at least two locking members are circumferentially spaced apart on the flange-engaging member.

18. The clutch of claim 1, wherein the hub further comprises a generally cylindrical collar adapted for mounting the hub on the driveshaft.

19. The clutch of claim 18, wherein the flange-engaging member comprises a first surface adjacent to the flange and a second surface opposite the first surface, and wherein the biasing member is a spring positioned along the axis of the driveshaft and further positioned to engage the second surface of the flange-engaging member.

20. The clutch of claim 19, wherein the connecting member is a bolt, and wherein the spring is positioned between a head of the bolt and the second surface of the flange-engaging member.

* * * * *